Jan. 14, 1941.　　　W. W. HOFFMAN　　　2,229,013
CENTRIFUGAL BRAKING APPARATUS
Filed June 14, 1938　　　3 Sheets-Sheet 1
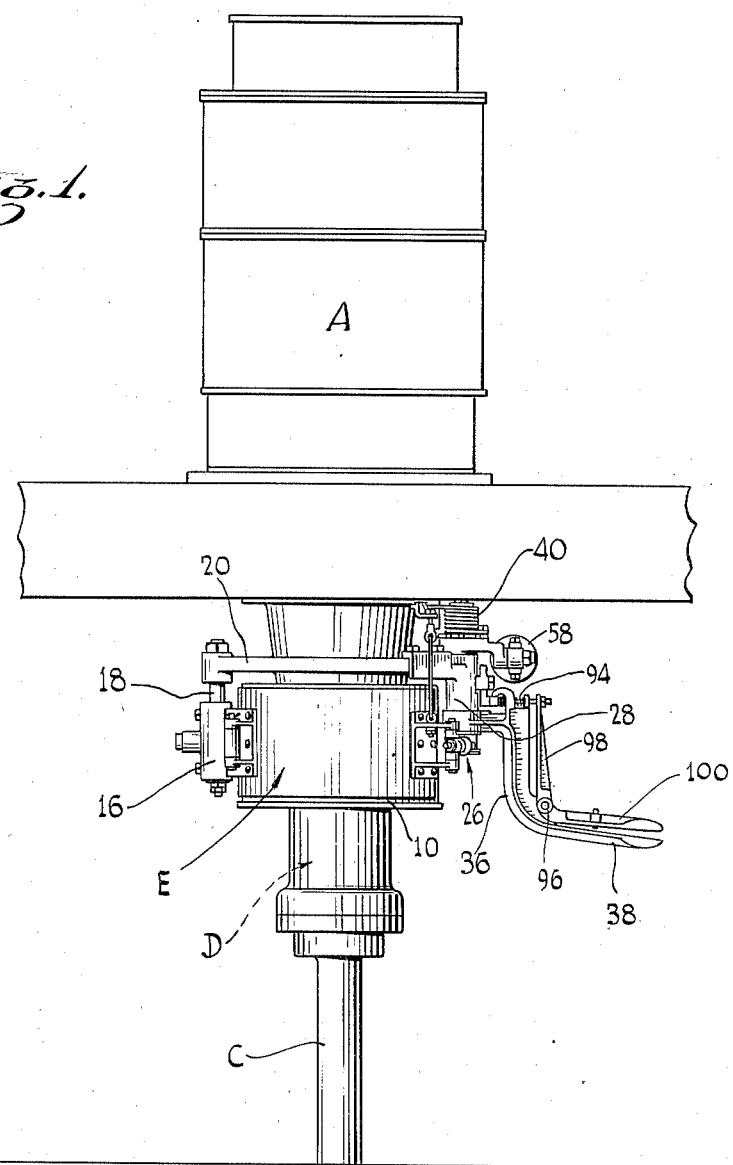
INVENTOR
WALTER W. HOFFMAN
BY
ATTORNEYS

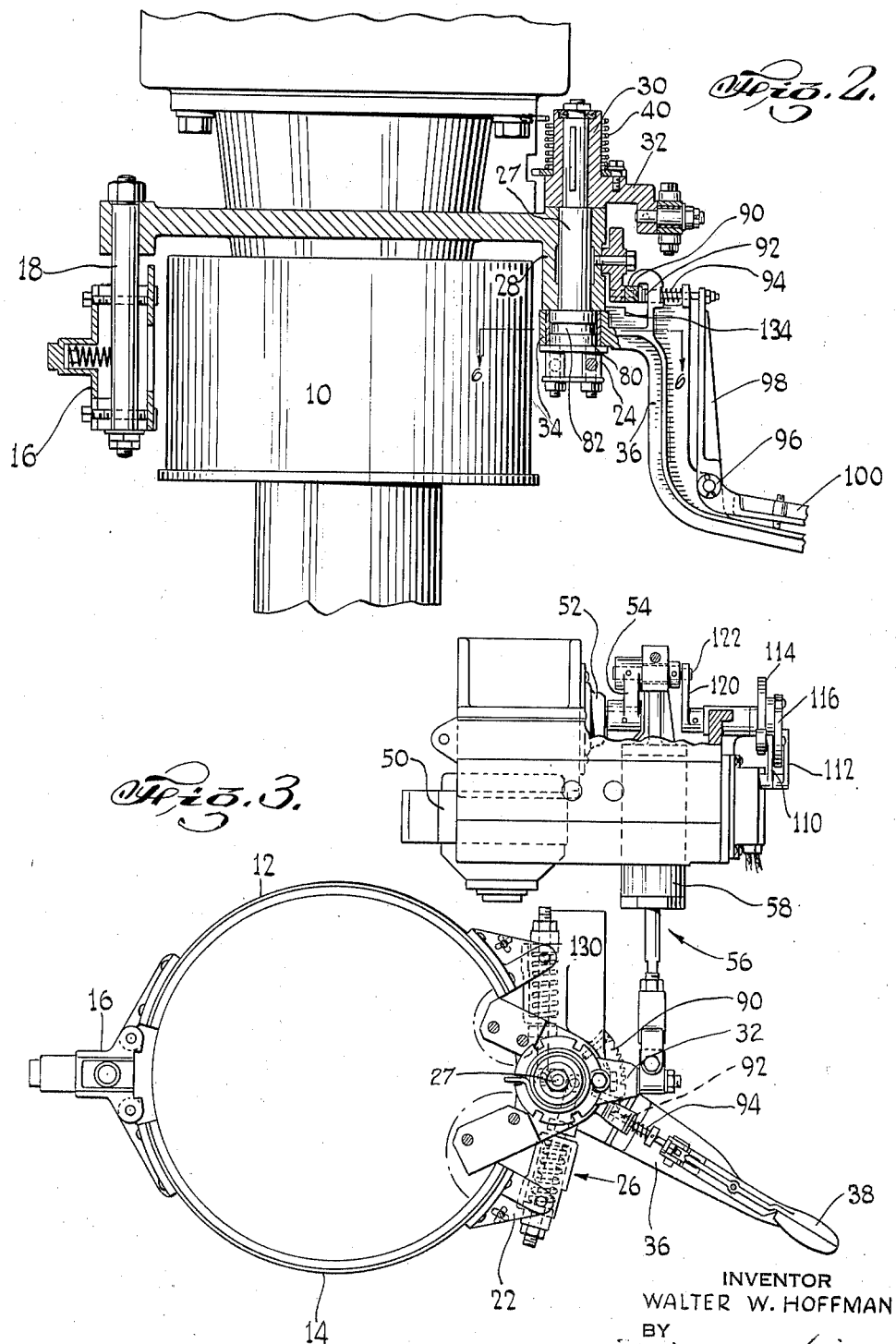

Jan. 14, 1941.  W. W. HOFFMAN  2,229,013
CENTRIFUGAL BRAKING APPARATUS
Filed June 14, 1938  3 Sheets-Sheet 3
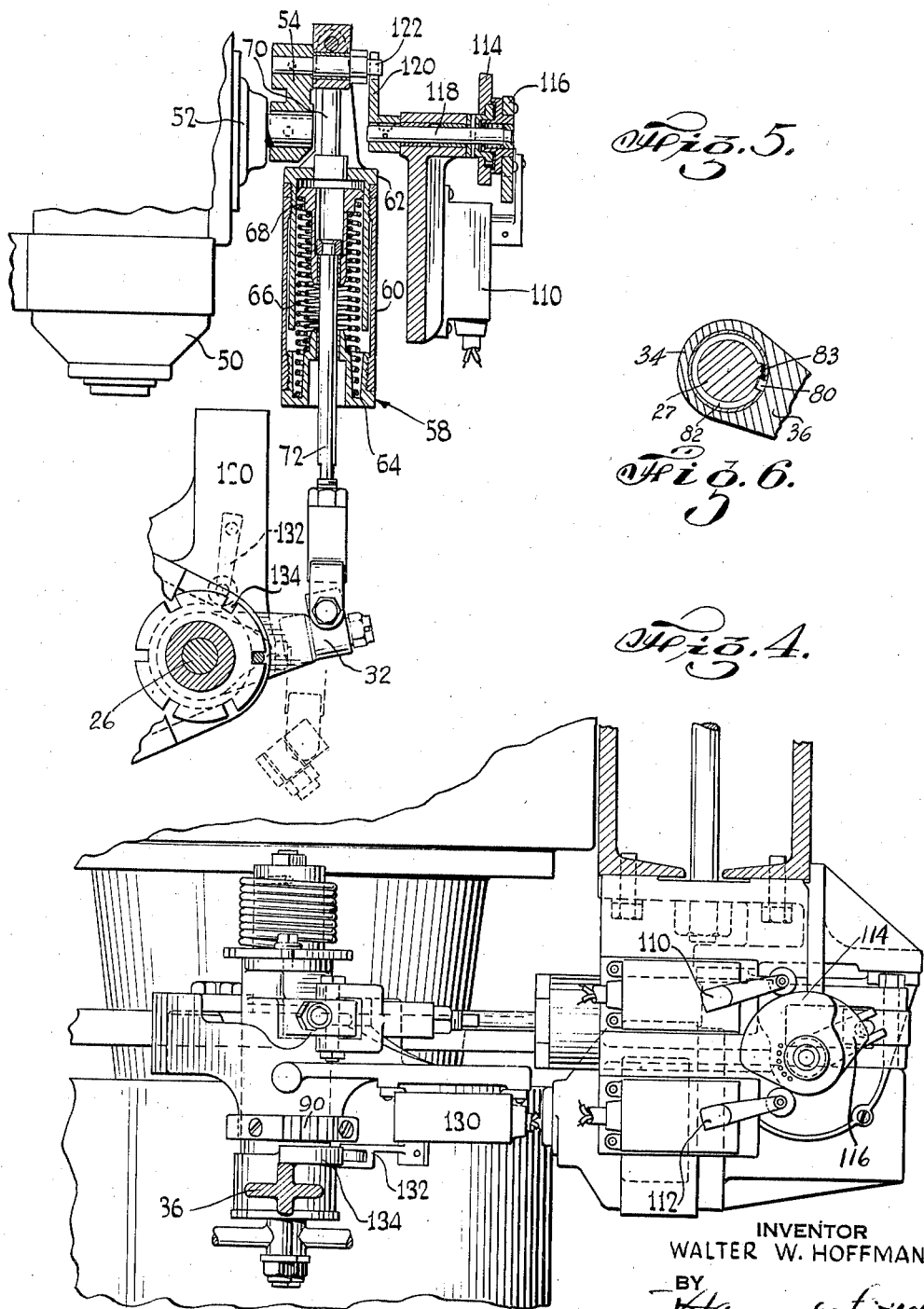
INVENTOR
WALTER W. HOFFMAN
BY
ATTORNEYS Patented Jan. 14, 1941

2,229,013

UNITED STATES PATENT OFFICE 2,229,013

CENTRIFUGAL BRAKING APPARATUS

Walter W. Hoffman, Hamilton, Ohio, assignor to The Western States Machine Company, New York, N. Y., a corporation of Utah Application June 14, 1938, Serial No. 213,573

11 Claims. (Cl. 192—2)

This invention relates to new and improved braking means for retarding the rotation of revolving bodies and, more particularly, to such braking means in combination with centrifugal apparatus of the type which is operated at high speeds and on short operating cycles, as in the processing of sugar and like materials.

An object of the invention is to provide centrifugal apparatus having a mechanical brake, together with novel brake actuating means which is capable of operating positively and efficiently and under automatic electric control. Another object is to provide new and improved braking means of this type that is particularly suited for use with centrifugals, the cycles of operation and cycle components of which are kept under automatic and electrical control.

Another object of the invention is to provide braking means in combination with a centrifugal machine, including a mechanical brake and brake actuating means which permits the brake to be applied and released electrically in the usual operation of the machine and enables the attendant of the machine conveniently and quickly to apply the brake at will, without dependence on electrical actuation.

A further object of the invention is to provide new and improved braking mechanisms embodying means for either electric or manual actuation of the brake, means for co-ordinating the operations of the brake with other operations of the machine upon which it is used, and special features of construction and operation that render the mechanism highly efficient and advantageous in uses for which known brake mechanisms are not well suited.

A preferred embodiment of my invention is illustrated in the accompanying drawings. It is understood, however, that the invention may be embodied in other constructions, differing widely from the illustrated embodiment, while still profiting from the contribution of the invention as defined in the claims appended hereto.

In the drawings,

Figure 1 is a front view of a motor driven centrifugal machine, including an overhead driving motor A, a curb or casing B surrounding a centrifugal basket carried by an oscillatory spindle C, a suspension head D for the spindle, and a mechanical brake E for retarding revolution of the basket and spindle.

Figure 2 is a more detailed illustration, partly in section, showing parts of the brake and of the improved brake actuating means.

Figure 3 is a plan view of the brake actuating means in operative association with the brake.

Figure 4 is a side elevation of the brake and brake actuating mechanism illustrated in Figures 1 and 3.

Figure 5 is a horizontal view, partly in section, showing parts of the brake actuating and control means.

Figure 6 is a horizontal section along line 6—6 of Figure 2, showing a detail of construction.

In accordance with the present invention, a centrifugal machine of the type illustrated in Figure 1 is provided with a mechanical brake for cooperation with a brake drum secured to the rotary spindle which carries the centrifugal basket, and novel brake actuating means are provided for bringing the brake into frictional engagement with the drum, and for releasing it therefrom, to retard revolution of the centrifugal or to permit free revolution of the same during its processing operations. The brake actuating means includes an electrical motor and reduction gearing, which are connected with the brake and are operable electrically to apply the brake at a predetermined time and with uniform braking effect in each cycle of operation of the centrifugal, as well as to release the brake whenever desired in the operation of the machine. The brake actuating means also includes manually operable means comprising a brake lever and handle, which extend to a position convenient to the attendant of the centrifugal and may be operated by the attendant readily, and at will, so as to apply the brake independently of the mechanism maintained under electrical control. Provision is made for returning the brake to inactive position whenever the electrically operated and manually operated actuating means are released. In addition, the connection between the brake and the motor and reduction gearing of the electrically operated means includes a device for keeping the braking tension uniform in successive actuations of the brake and for enabling adjustments of the braking tension whenever desired in order to shorten or lengthen the braking time in each centrifugal cycle or to adjust the braking tension for best performance when retarding revolution of the centrifugal from different speeds. The manually operated actuating means comprises a manually releasible locking device which permits the brake to be applied manually in different positions of tension and to be held in any of such positions until released. Both actuating means, when embodied in motor driven centrifugal apparatus as illustrated, are associated with control means such that application of the brake prevents the flow of current to the driving motor for the centrifugal and results in appropriate control over other operations of the apparatus.

Reference will now be made to the drawings for illustrative details. A brake drum 10, rigidly secured to the centrifugal shaft, cooperates with braking means E comprising brake band sections 12 and 14 having friction linings which embrace the drum on opposite sides thereof. Adjacent ends of the band sections are fulcrumed on a bracket 16, which is adjustably mounted on a stationary suspension pin 18 depending from a fixed support 20. Each of the other ends of the brake band sections carries a bracket 22 which is connected, through a connecting device 26, to an eccentric pin 24 on the end of a rotatable brake actuating spindle 27. The connecting device in each instance is preferably spring loaded and adjustable in order to vary the tension of the spring and equalize the wear on the linings carried by the brake band sections. The structure just described is known and forms no essential part of the present invention, since other types of brakes may be controlled by the novel apparatus hereinafter described.

The brake actuating spindle 27 is supported in a stationary bearing 28 carried by the support 20. Its upper end extends above the bearing and is keyed to a hub 30 from which extends a radial brake actuating lever 32. Its lower end extends below bearing 28 and, between the bearing and pins 24, is surrounded by a sleeve 34 that is fastened to a radially extending lever 36 having a handle 38 adjacent its outer end. A tension spring 40 surrounds the upper portion of hub 30, with one end anchored to stationary framework of the centrifugal apparatus and the other end secured to the hub so as normally to urge the hub, the brake spindle and the brake to a position in which the brake is inactive.

It will be apparent that when lever 32 is moved in a counterclockwise direction, as viewed in Figures 3 and 5, the brake spindle 27 is moved similarly and the brake band sections 12 and 14, through their respective connecting devices 26, are contracted into frictional engagement with the drum 10, thus retarding revolution of the drum and of the shaft to which it is secured. This movement of lever 32 is effected, in the usual operation of the machine, by means of a motor 50 which drives a crank arm 54 through reduction gearing 52. The crank arm 54 is connected with the end of lever 32 through a connecting rod assembly 56, embodying an adjustable tensioning device 58, so that when the crank arm is in one position, e. g., away from the brake spindle as shown in Figures 3, 4 and 5, the brake is applied, and when the crank arm is in a position toward the brake spindle, the lever 32 is released and permitted to move to the dotted line position of Figure 5, in which the brake is inactive, where it remains under the influence of spring 40 until the brake is again actuated. By the use of an electric motor 50 and reduction gearing 52, the actuation of the brake through the described mechanism may be effected quickly and positively and under accurate and uniform control.

The tensioning device 58, as illustrated, includes a barrel 60 having swivel block ends 62 and 64, internal compression springs 66 and a floating device 68. The compression springs 66 lie between block 64 and device 68 and urge the latter toward block 62, which is connected with the crank arm 54 through a rod 70. The floating device 68 is slidably sleeved on a rod 72, which is connected to lever 32. When the motor 50 is energized to apply the brake, the tensioning device 58 is pulled away from the brake spindle and a predetermined tension is exerted on the lever 32 through compression springs 66. This causes brake spindle 27 to rotate and contract the friction linings of the brake band against the drum 10, retarding revolution of the centrifugal at a definite predetermined rate. The compression of springs 66 and the tension imposed on the brake bands upon energization of the motor may be varied as desired by adjustment of the swivel block ends 62 and 64 of the tensioning device. When the motor 50 is energized to release the brake, the crank arm 54 is moved toward the brake spindle, the tension on rod 72 through tensioning device 58 is relieved, and the brake is returned to inactive position by spring 40.

In addition to the above-mentioned electrical actuation of the brake, provision is made for manual actuation at the will of the attendant of the machine, through lever 36 and handle 38. The sleeve 34 fastened to lever 36 is arranged on the lower portion of spindle 27 so that the spindle and the brake mechanism move independently of lever 36 when actuated electrically as hereinabove described. A detent 80 projects inwardly from sleeve 34 and into an arcuate groove 82 in the lower portion of the brake spindle. Groove 82 terminates in a radial abutment 83 which lies adjacent pin 80 when the brake is in inactive position. Thus when lever 36 is moved in a counterclockwise direction, as viewed in Figure 3, pin 80 engages against the aforesaid abutment and turns spindle 26 in the proper direction to apply the brake. This results in corresponding movement of lever 32 and rod 72, but meets with no resistance from the electrically operated brake actuating means due to the sliding connection between rod 72 and the tensioning device 58. The lever 36 and handle 38, extending to a position convenient for ready actuation by the attendant of the machine, therefore constitute the principal parts of secondary brake actuating means which may be actuated at will independently of the electrically operated brake actuating means.

The manually operable mechanism including lever 36 preferably is provided with means for releasably locking the brake in different positions so that selected braking effects may be obtained and so that the brake and actuating means may be held automatically at the selected setting. To this end, a stationary ratchet 90, fastened to the bearing structure 28, cooperates with a spring pressed pawl 92. The latter is carried by lever 36 and is reciprocable against the force of a spring 94 through the medium of a crank lever, which is fulcrumed at 96 and has one arm 98 engaging an end of pawl 92 and another arm 100 extending adjacent to handle 38. The attendant manipulating the brake mechanism may release pawl 92 from engagement with a tooth on ratchet 90 by pressing the arm 100 of the crank lever toward the handle 38 of lever 36.

In conjunction with the parts already described, the illustrated embodiment includes control means for governing the flow of current to the motor 50, and to other elements of the centrifugal, in accordance with the condition of actuation of the brake. In the illustrated form, the control means associated with the electrically operated brake actuating means comprises a limit switch 110 which is held in one position when the brake is applied and in another position when the brake is inactive, another limit switch 112 which is held in different positions according to the position of the brake, and cam switching elements 114 and 116 for governing the positions of the respective switches. These cam elements are mounted on a control shaft 118 having a crank 120 that is connected with a pin 122 extending from crank arm 54 for movement with the latter. By the use of these control switches so associated with the brake actuating means, the flow of current to the brake motor 50 may be interrupted and passage of current to the centrifugal motor A may be prevented when the brake has been applied through motor 50. When motor 50 is reversely energized through another circuit bridging switch 110 and the brake released by movement of crank 54, switch 112 is operated to open this circuit to the brake motor 50 and cause the mechanism to come to rest, while switch 110 is restored to a position permitting re-energization of the brake and centrifugal motors in the next cycle of operation of the centrifugal machine.

A third limit switch 130 is provided for cooperation with the manually operable brake actuating means when the latter is used to retard revolution of the machine. This third switch includes a switch arm 132 lying in the path of a cam 134 secured to lever 36, as illustrated in Figures 4 and 5, so that movement of lever 36 in a counterclockwise direction to apply the brake will operate switch 130 and open all electrical circuits for the centrifugal machine. The circuits in which current flows to the powering motor A of the centrifugal, the brake motor 50 and to other units of the centrifugal apparatus that are maintained under electrical control will be apparent to skilled electricians, and as such they form no part of the present invention.

In the operation of a motor driven centrifugal embodying the present invention and provided with means for maintaining the cycle of operation under automatic timed control, after the motor A for the centrifugal has been energized to bring the basket to full speed and to keep it at such speed for the desired time interval, the flow of current to motor A is interrupted and current is passed to motor 50, to apply the brake, through the contact of limit switch 110, which is normally closed while the brake is inactive. As motor 50, reduction gearing 52, crank arms 54 and 120 and the brake mechanism reach brake-on position, cam 114 opens the contact of limit switch 110 and thus opens the brake motor circuit, the motor and connected parts coming to rest in a position where the brake is applied with predetermined tension through tensioning device 58. In this same stage of operation, the contact of limit switch 112, which is normally open when the brake is off, is changed from open to closed position by cam 116. Thereafter, by actuation of a switch which may be actuated at will, current may be flowed through limit switch 112 to reverse the brake motor 50 and move cranks 54 and 120 to a position in which the brake is inactive. This again opens the contact of limit switch 112 and closes the contact of limit switch 110, restoring the latter to a condition permitting reapplication of the brake upon closing of an appropriate brake actuating circuit therethrough.

The apparatus provided by the present invention may be used to advantage for retarding the revolution of revolving bodies other than centrifugal machines, but it is of particular value when used substantially as disclosed herein with centrifugal machines which operate on relatively short cycles to and from high speeds. The utility of the invention is not restricted to centrifugals driven by directly connected electrical motors, nor to embodiment with brakes of any particular construction, nor to details of construction and arrangement which are illustrated as parts of a preferred embodiment but are not essential to the substance of the invention as disclosed herein and defined in the appended claims.

I claim:

1. Centrifugal apparatus comprising a rotary driving shaft for a centrifugal basket, a brake drum secured to the shaft, stationary supporting means adjacent to said drum, friction braking means mounted on said supporting means for movement into and out of frictional engagement with said drum, and means for electrically or manually moving said braking means into and out of frictional engagement with said drum, said means comprising a brake spindle, primary electrically operated brake actuating means including an electrical driving motor, reduction gearing connected therewith and means connecting said reduction gearing with said spindle, and secondary, manually, and independently operable brake actuating means including a lever connected with said spindle and extending therefrom to a position to be moved by an attendant of the centrifugal.

2. In a centrifugal having a vertical driving shaft and a brake drum carried by said shaft, mechanical brake means mounted on a fixed support for movement into and out of frictional engagement with said drum for retarding revolution of the centrifugal, a rotary brake spindle connected with said brake means, primary brake actuating means including an electrical motor, reduction gearing connected therewith and means connecting said gearing with said spindle for applying said brake, secondary, manually operable brake actuating means connected with said spindle for applying said brake independent of said motor and reduction gearing, and means responsive to movement of each of said brake actuating means to braking position for preventing the flow of current to said motor.

3. In a centrifugal having a vertical driving shaft and a brake drum carried by said shaft, mechanical brake means mounted on a fixed support for movement into and out of frictional engagement with said drum for retarding revolution of the centrifugal, a rotary brake spindle connected with said brake means, primary brake actuating means including an electrical motor, reduction gearing connected therewith and means connecting said gearing with said spindle for applying said brake, secondary, manually operable mechanical brake actuating means connected with said spindle for applying said brake independent of said motor and reduction gearing, and spring means connected with said spindle and acting on the same to hold the brake means away from said drum when said primary and secondary braking actuating means are at inactive position.

4. In a motor driven centrifugal, a mechanical brake for retarding revolution of the centrifugal, primary brake actuating means including an electrical motor and reduction gearing for applying said brake, a first control switch for opening a circuit to said brake motor, means operative to open said switch upon movement of said brake actuating means to braking position, a second control switch for opening a circuit to the brake motor, means operative to open said second switch and to close said first switch upon movement of said brake actuating means away from braking position, secondary, manually operable brake actuating means for applying said brake independently of said motor and reduction gearing, a third control switch for opening a circuit to the centrifugal motor, and means operative to open said third switch upon movement of said secondary brake actuating means toward braking position.

5. In a centrifugal having a vertical basket carrying shaft, a brake drum secured thereto for rotation therewith and external brake bands having friction linings embracing said drum and mounted on a fixed support for movement into and out of frictional engagement with said drum, brake actuating means comprising a rotatable spindle, means connecting said spindle with said brake for applying or releasing the latter upon rotation of said spindle, a lever extending radially from said spindle, a motor, a crank arm, reduction gearing connecting said motor with said crank arm, and means interconnecting said lever and crank arm.

6. In a centrifugal having a vertical basket carrying shaft, a brake drum secured thereto for rotation therewith and external brake bands having friction linings embracing said drum and mounted on a fixed support for movement into and out of frictional engagement with said drum, brake actuating means comprising a rotatable spindle, means connecting said spindle with said brake for applying or releasing the latter upon rotation of said spindle, a lever extending radially from said spindle, an electrical motor and reduction gearing, and means including a yieldable tensioning device interconnecting said reduction gearing and said lever.

7. In a centrifugal having a vertical basket carrying shaft, a brake drum secured thereto for rotation therewith and external brake bands having friction linings embracing said drum and mounted on a fixed support for movement into and out of frictional engagement with said drum, brake actuating means comprising a rotatable spindle, means connecting said spindle with said brake for applying or releasing the latter upon rotation of said spindle, a lever extending radially from said spindle, an electrical motor and reduction gearing, means including a yieldable tensioning device connecting said reduction gearing and said lever, and means for adjusting the setting of said tensioning device to vary the tension of said brake when applied through said actuating means.

8. In a centrifugal having a brake drum secured to a rotary element thereof and a brake cooperating with said drum for retarding revolution of the centrifugal, brake actuating means comprising a rotatable spindle, means connecting said spindle with said brake for applying or releasing the latter upon rotation of said spindle, a lever extending radially from said spindle, a motor, a crank arm, reduction gearing connecting said motor and said crank arm and means interconnecting said lever and said crank arm, and manually operable brake actuating means comprising a hand lever extending radially from adjacent said spindle and means responsive to movement of said hand lever in one direction for rotating said spindle and applying said brake independently of said motor.

9. In combination with a rotary body having a brake drum secured thereto and a brake cooperating with said drum for retarding revolution of the body, brake actuating means for applying said brake comprising a rotatable spindle, a lever extending radially from said spindle, a motor, a crank arm, reduction gearing connecting said motor and said crank arm and means connecting said lever and said crank arm, and manually operable brake actuating means comprising a lever extending radially from adjacent said spindle, means responsive to movement thereof in one direction for rotating said spindle and applying said brake independently of said motor, and manually releasable means for locking said last-recited lever in different positions of actuation.

10. In a centrifugal having a brake drum secured to a rotary element thereof and a brake cooperating with said drum for retarding revolution of the centrifugal, brake actuating means comprising a rotatable brake spindle, means connecting said spindle with said brake for applying or releasing the latter upon rotation of said spindle, a lever keyed to said spindle and extending radially therefrom, an electrical motor, a crank arm, reduction gearing connecting said motor with said crank arm and means connecting said crank arm with said lever for simultaneous movement, said last recited means including separate rods connected with said lever and crank arm, respectively, a spring chamber secured to one of said rods and having a compression spring therein and an abutment carried by the other of said rods within said chamber and bearing against said compression spring.

11. In a centrifugal having a brake drum secured to a rotary element thereof and external brake bands cooperating with said drum for retarding revolution of the centrifugal, brake actuating means comprising a rotatable brake spindle, means connecting said spindle with said brake bands for applying the same to or releasing the same from said drum upon rotation of said spindle, a lever keyed to said spindle and extending radially therefrom, an electrical motor, a crank arm, reduction gearing connecting said motor with said crank arm, means connecting said crank arm with said lever for simultaneous movement, spring means normally urging said spindle in a direction to release said brake bands, a hand lever fulcrumed coaxially with said spindle, a handle on said hand lever within reach of a centrifugal attendant, and cooperating means on said hand lever and spindle for turning the latter to apply said brake bands independently of the aforesaid motor and reduction gearing in response to manual movement of said hand lever.

WALTER W. HOFFMAN.